United States Patent
Jin

(10) Patent No.: US 6,525,506 B2
(45) Date of Patent: Feb. 25, 2003

(54) CURRENT LIMIT CIRCUIT OF INVERTER REFRIGERATOR

(75) Inventor: Byeng Yeob Jin, Changwon (KR)

(73) Assignee: LG Electronics Inc., Seoul (KR)

(*) Notice: Subject to any disclaimer, the term of this patent is extended or adjusted under 35 U.S.C. 154(b) by 85 days.

(21) Appl. No.: 09/764,754

(22) Filed: Jan. 18, 2001

(65) Prior Publication Data

US 2001/0009360 A1 Jul. 26, 2001

(30) Foreign Application Priority Data

Jan. 21, 2000 (KR) ............................................. 00-2867

(51) Int. Cl.[7] ............................................... H02P 7/42
(52) U.S. Cl. ....................... 318/801; 318/138; 318/254; 318/439; 318/700; 318/701; 318/721; 318/722; 318/599; 318/800; 318/811
(58) Field of Search ................................. 318/801, 811, 318/701, 721, 599, 138, 254, 722, 439

(56) References Cited

U.S. PATENT DOCUMENTS 4,879,502 A * 11/1989 Endo et al. .................. 318/723
5,353,604 A * 10/1994 Oguni et al. ................... 62/207
5,483,141 A * 1/1996 Uesugi ......................... 318/811
6,244,061 B1 * 6/2001 Takagi et al. .................. 62/229

* cited by examiner

Primary Examiner—Robert E. Nappi
Assistant Examiner—Tyrone W Smith
(74) Attorney, Agent, or Firm—Ostrolenk, Faber, Gerb & Soffen, LLP

(57) ABSTRACT

The present invention relates to a current limit circuit of an inverter refrigerator. The present invention comprises a current limit unit for outputting a current limit signal by comparing an excess current generation due to load change with a limit current level set in advance. Accordingly, the present invention can extend life span of a compressor by protecting a BLDC motor from the excess current and reducing permanent magnet demagnetization due to the excess current. In addition, the present invention can improve a mobility of a motor by maintaining uniform torque with stable current in the operation, and can operate a compressor stably without turning off by a momentary excess current in the compressor operation.

7 Claims, 4 Drawing Sheets

CURRENT WAVE FORM

PWM WAVE FORM

GATE WAVE FORM

FIG. 3
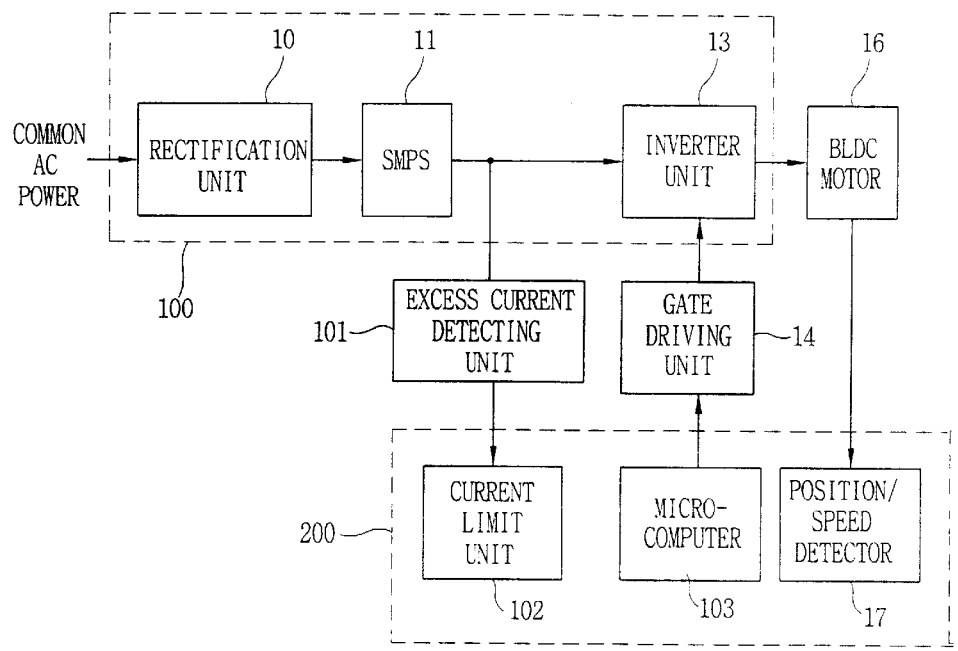
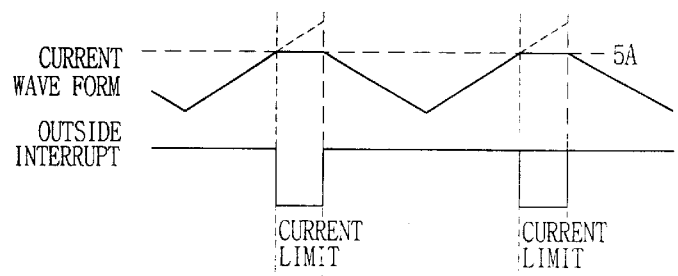
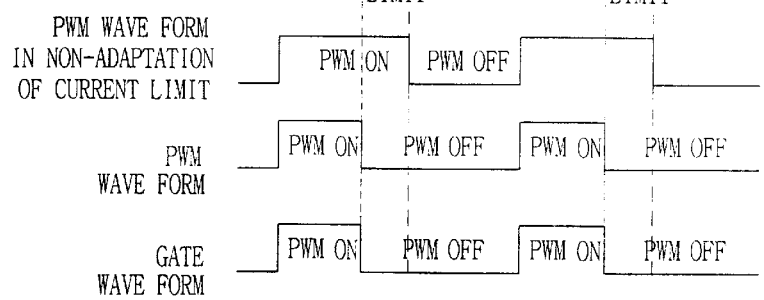

CURRENT LIMIT CIRCUIT OF INVERTER REFRIGERATOR

BACKGROUND OF THE INVENTION

1. Field of the Invention

The present invention relates to a current restriction circuit of an inverter refrigerator, in particular to a current limit circuit of an inverter refrigerator which is capable of driving a compressor of a refrigerator stably by making current set in advance flow when excess current flows due to an outside factor by adjusting a PWM duty cycle of a pulse width modulation controlling a power element.

2. Description of the Prior Art

In general, an inverter refrigerator is a refrigerator which is capable of optimizing a cooling air discharge and power consumption quantity by improving defects of an ON-OFF type refrigerator turning on/off a compressor with a certain time interval.

The inverter refrigerator comprises a SMPS (Switching Mode Power Supply), switching elements connected to a brushless DC motor (hereinafter, it is referred to a BLDC motor), a gate drive for controlling the switching elements, a position/speed detector for detecting a position and speed of a rotator of the BLDC motor, and a momentary excess current protection circuit.

FIG. 1 is a construction profile illustrating an excess current protection channel of the conventional inverter refrigerator, it comprises a rectification unit 10 for outputting a rectified and smoothed DC power source by rectifying and smoothing a common AC power source inputted from outside, a SMPS 11 for being inputted the DC power rectified and smoothed from the rectification unit 10 and providing the power to each circuit unit inside of an apparatus, an inverter unit 13 for being inputted the DC power provided from the SMPS 11 in accordance with a certain control signal, converting it into three phase power, and outputting it, an excess current detecting unit 12 for detecting excess current generation due to load change from the SMPS 11, a BLDC motor 16 driven by the 3 phase AC power of the inverter unit 13, a position/speed detector 17 for detecting the position and speed of the rotator of the BLDC motor 16, a microcomputer 15 for controlling a pulse width modulation signal by comparing position/speed of the rotator outputted from a detecting signal of the position/speed detector 17 with a requested phase angle and phase difference, and generating a pulse width modulation signal by being inputted an excess current detecting signal from the excess current detecting unit 12, and a gate driving unit 14 for controlling ON/OFF of the inverter unit 13 in accordance with the pulse width modulation signal outputted from the microcomputer 15.

The operation of the excess current protecting circuit of the conventional inverter refrigerator will now be described.

First, when the common AC power source inputted from outside is inputted to the rectification unit 10, the rectification unit 10 outputs the rectified and smoothed DC power source to the SMPS 11. The SMPS 11 inputted the DC power source provides a power to the each circuit unit as a transformer having different winding ratio each other.

The inverter unit 13 inputted the DC power outputted from the SMPS 11 outputs three phase power to the BLDC motor 16 by being ON/OFF in accordance with a control signal outputted from the gate driving unit 14.

When the BLDC motor operates, the position/speed detector 17 detects the speed and position of the motor rotator, and applies it to the microcomputer 15.

The microcomputer 15 judges the position and speed of the rotator by using the position and speed detecting signal of the BLDC motor rotator outputted from the position/speed detector 17, compares the detected position and speed with the requested phase angle and phase difference, and applies a PWM (Pulse Width Modulation) signal according to it to the gate driving unit 14.

Herein, the SMPS 11 is constructed with a plurality of windings having different winding ratio each other, accordingly a short circuit occurs frequently due to mutual contact of the windings, and excess current is generated by the load change due to it. Herein, the excess current detecting unit 12 detects the excess current due to the load change of the SMPS 11, and applies the excess current detecting signal in accordance with it to the microcomputer 15.

And, the microcomputer 15 outputs a control signal for turning off all switching elements of the inverter 13 to the gate driving unit 14 in order to protect damage of the compressor due to the excess current. It will now be described in more detail with reference to accompanying drawings.

FIGS. 2a~2c are waveform diagrams illustrating the operation of the conventional inverter refrigerator excess current protection circuit in the excess current generation. For example, as depicted in FIGS. 2a and 2b, when higher than 9A arm short DC peak voltage is generated, the microcomputer 15 outputs the pulse width modulation signal to the gate driving unit. And, as depicted in FIG. 2c, the gate driving unit 14 protects the compressor by outputting the control signal to the inverter unit 13 in order to make the BLDC motor 16 turn off for 2 seconds ~7 minutes.

However, in the conventional technology, when the excess current is generated, because the compressor is OFF for a certain time (2~7 seconds), mobility of the compressor lowers. In addition, in order to prevent turning off of the compressor during the operation and reduce mobility defect, the DC peak voltage is set as a voltage level corresponding to a high current of the arm short type, for example 9A, accordingly the efficiency lowers due to damage of the power elements or demagnetization of the motor of the compressor.

SUMMARY OF THE INVENTION

The object of the present invention is to provide a current limit circuit of an inverter refrigerator which is capable of making limit current set in advance flow into a motor of a compressor when excess current is generated by adjusting a PWM duty cycle of a pulse width modulation controlling the operation of current elements.

In order to achieve the above-mentioned objects, the current limit circuit of the inverter refrigerator in accordance with the present invention comprises a power unit 102 for providing DC power source to a BLDC motor 16 by being inputted an AC power source, a current detecting unit 101 for detecting current flowed into the BLDC motor 16, a control unit 200 for outputting a current limit control signal by being inputted a current detecting signal outputted from the current detecting unit 101 and comparing the present detecting current level corresponding to the current detecting signal with the current limit level set in advance, and a gate driving unit 14 for controlling the operation of the power unit 102 in accordance with the current limit signal outputted from the control unit 200.

In order to achieve the above-mentioned objects, the present invention comprises a setting process for setting a current limit level flowed into the motor, a comparing process for comparing the set current limit level with the present detecting current level, and a control process for controlling the current limit level so as to be flowed into the motor when the detecting current level is higher than the set current limit level.

BRIEF DESCRIPTION OF THE DRAWING

FIG. 3 is a block diagram illustrating a current limit circuit of an inverter refrigerator in accordance with the present invention.

FIGS. 4A through 4E are waveform diagrams illustrating the operation of the current limit circuit of the inverter refrigerator in accordance with the present invention.

DETAILED DESCRIPTION OF THE PREFERRED EMBODIMENT

Figure 1:
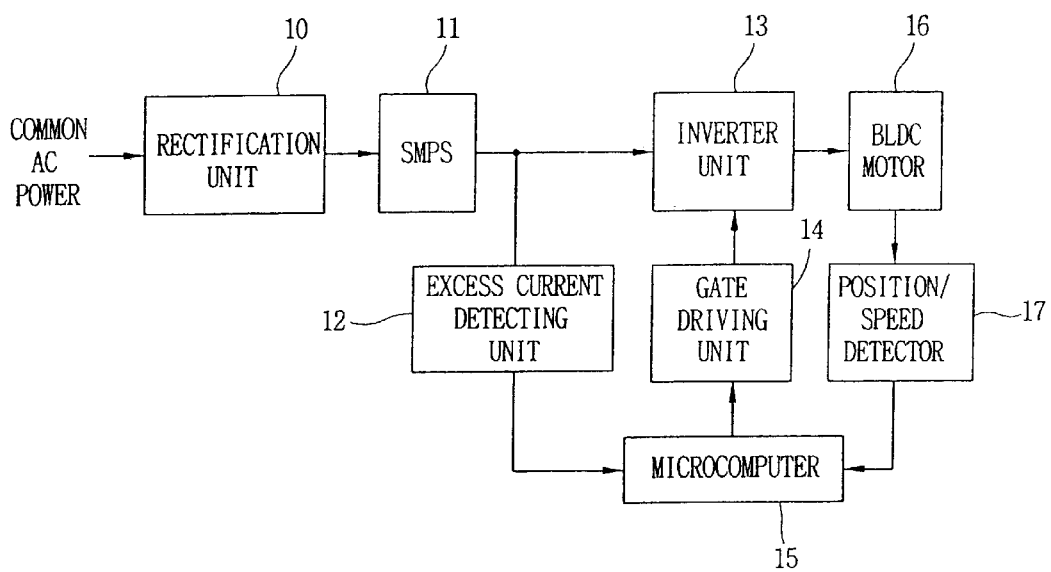
FIG. 1 is a block diagram illustrating an excess current protection circuit of the conventional refrigerator.
Figure 2A:
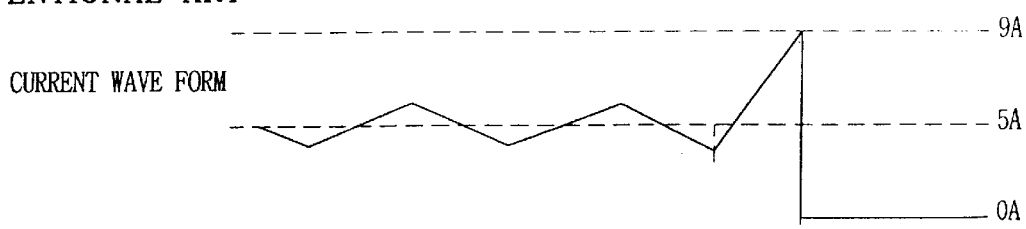
FIGS. 2A through 2C are waveform diagrams illustrating a pulse width modulation signal of the excess current protection circuit of the conventional inverter refrigerator in DC peak voltage generation.
Figure 2B:
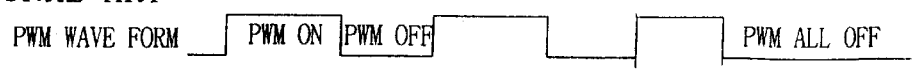
Figure 2C:

FIG. 3 is a block diagram illustrating an inverter refrigerator current limit circuit in accordance with the present invention.

As depicted in FIG. 3, the current limit circuit of the inverter refrigerator in accordance with the present invention comprises a power unit 102 for providing DC power source to a BLDC motor 16 by being inputted an AC power source, a current detecting unit 101 for detecting current flowed into the BLDC motor 16, a control unit 200 for outputting a current limit control signal by being inputted a current detecting signal outputted from the current detecting unit 101 and comparing the present detecting current level corresponding to the current detecting signal with the current limit level set in advance, and a gate driving unit 14 for controlling the operation of the power unit 102 in accordance with the current limit signal outputted from the control unit 200.

The power unit 102 comprises a rectification unit 10 for outputting the rectified and smoothed DC power by rectifying and smoothing a common AC power source inputted from outside, a SMPS 11 for being inputted the DC power rectified and smoothed from the rectification unit 10 and providing the power to each circuit unit inside of an apparatus, an inverter unit 13 for being inputted the DC power source provided from the SMPS 11 in accordance with a certain control signal, converting it into three phase power, and outputting it. The control unit 200 comprises a current limit unit 102 for outputting a current limit signal when the excess current generation is detected from the excess current detecting unit 101, a position/speed detector 17 for detecting position and speed of a rotator of the BLDC motor 16, and a microcomputer 103 for outputting a pulse width modulation signal in accordance with the current limit signal of the current limit unit 102 while outputting the pulse width modulation signal by judging the position and speed of the rotator with the detecting signal of the position/speed detector 17 and comparing it with the requested phase angle and phase difference.

Herein, the rectification unit 10 is constructed with a bridge diode and a smoothing condenser, and the microcomputer 103 further comprises an external interrupt port for quick response.

FIG.4a~4e are waveform diagrams illustrating the operation of the current limit circuit of the inverter refrigerator in accordance with the present invention. FIG. 4a is a waveform diagram adapting a current limit circuit having a reference current value 5A, FIG. 4b is a waveform diagram of an external interrupt output signal adapted to the current limit signal by the current limit circuit. In other words, the current limit unit 102 sets a current lower than the arm short type high value 9A and higher than a stable current 2A as a limit current 5A, it outputs the current limit signal to the external interrupt port of the microcomputer 103 for the quick response when the limit current exceeds the set value 5a. After that, as depicted in FIG. 4d, the duty cycle of the pulse width modulation signal outputted at the present is OFF momentarily by the external interrupt port of the microcomputer 103, accordingly the current does not increase any more and the certain current 5A is maintained momentarily.

Figure 5:
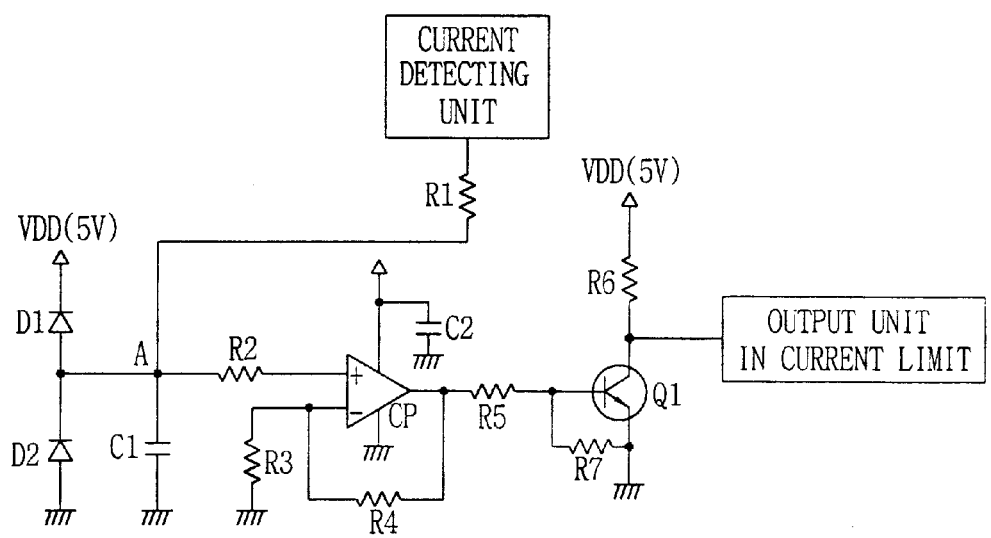
FIG. 5 is a circuit diagram illustrating a current limit unit of the current limit circuit of the inverter refrigerator in accordance with the present invention.

FIG. 5 is a circuit diagram illustrating the current limit unit of the current limit circuit of the inverter refrigerator in accordance with the present invention in detail. In other words, a first and second diodes are serially contacted to between power voltage VDD and grounding to a reverse direction, a contact point nod A is contacted to a capacitor C1 its side is grounded with a first resistance R1 applied the current detecting signal on one side. The nod A is contacted to a non-inversion terminal (+) of a comparator CP through a second resistance R2, a third resistance R3 grounded to an inversion terminal (−) of the comparator CP and an output terminal of the comparator CP are contacted through a fourth resistance R4. The output terminal of the comparator CP is contacted to a base of a NPN transistor Q1 through a fifth resistance R5, and a collector of the NPN transistor Q1 is contacted to a sixth resistance R6 applied the power voltage VDD on the one side. A seventh resistance R7 is contacted between a grounded emitter and the base of the NPN transistor Q1, an output signal is outputted from a collector side of the NPN transistor Q1.

The operation of the current limit circuit of the inverter refrigerator in accordance with the present invention will now be described.

First, the rectification unit 10 rectifies the common AC power source inputted from outside into the DC power source removed AC elements by using the bridge diode, and smoothes it into the smoothing DC source by using the smoothing condenser. The rectified and smoothed DC power source is outputted to the SMPS 11, the SMPS 11 is inputted the DC power source outputted from the rectification unit 10 and provides the power source to the each circuit unit inside of the apparatus. In order to convert the DC voltage provided from the SMPS 11 into the three phase AC power source for driving the BLDC motor 16, the inverter unit 13 turns on/off the switching element in accordance with the switching control signal of the gate driving unit 14. When the BLDC motor 16 drives, the position/speed detector 17 detects the speed of the motor and position of the rotator and applies it to the microcomputer 103. The microcomputer 103 judges the position of the rotator from the position and speed detecting signal outputted from the position/speed detector 17, compares it with the requested phase angle and phase difference, and applies the pulse width modulation signal according to it to the gate driving unit 14. The gate driving unit 14 is inputted the pulse width modulation signal outputted from the microcomputer 103 and applies the switching control signal to the inverter unit 13. In other words, when the microcomputer 103 provides the duty cycle adjusted pulse width modulation signal to the gate driving unit 14, the gate driving unit 14 controls the voltage applied to the BLDC motor 16 by turning on/off the switching element of the inverter unit. Herein, the duty cycle is a numerical value indicating pulse width ratio about the pulse cycle, equivalence voltage is changed by unchanging the volume of the DC power source and changing output time of the voltage on the pulse phase, the applied voltage increase in proportion to the volume of the duty cycle.

In other words, the current limit circuit of the inverter refrigerator in accordance with the present invention compares the current level detected from the current detecting unit 101 with the current limit level 5A set in advance on the current detecting unit 101. Herein, the detected current level is higher than the set level 5A, the signal according to it is outputted to the external interrupt port of the microcomputer 103 for the quick response. The duty cycle of the present outputted pulse width modulation signal is OFF momentarily by the current limit signal inputted to the external interrupt port of the microcomputer 103.

The operation of the current limit unit 102 will now be described in more detail with reference to accompanying FIG. 5. First, when the current detecting signal is higher than 5A, the comparator CP outputs a high signal, according to it, the NPN transistor Q1 is turned on according to it, and a low current limit signal is outputted. On the contrary, when the current detecting signal is lower than 5A, the comparator CP outputs the low signal, the NPN transistor Q1 is turned off according to it, and the high current limit signal is outputted. In other words, the microcomputer 103 outputs the pulse width modulation signal as depicted in FIG. 4c by being inputted the low current limit signal from the current limit unit 102 and turning off the duty cycle of the present outputted pule width modulation signal momentarily.

Then, the current flowed into the switching element of the inverter unit 13 does not increase any more, and a certain current is maintained momentarily.

As described above, the present invention can reduce expenses by protecting the power element from the excess current and adapting small capacity power element, can extend the life span of the compressor by protecting the motor from the excess current and reducing permanent magnet demagnetization due to the excess current. In addition, in the present invention, the mobility of the compressor can be improved by maintaining uniform torque with stable current in the operation, and the compressor can operate stably without being turned off by the momentary excess current in the operation.

What is claimed is:

1. A current limit circuit of an inverter refrigerator, comprising:

a power unit for providing a DC power source to a BLDC motor by being inputted an AC power:

an excess current detecting unit for detecting current flowed into the BLDC motor;

a control limit unit for outputting a current limit signal when an excess current is detected from the excess current detecting unit, wherein the current limit unit includes a first diode and a second diode connected in series between a power voltage node and ground in a reversely biased direction, a common connection node A is connected to one side of a capacitor having its other side grounded with a current detecting signal applied through a first resistance to the one side of the capacitor connected to the node A, the node A is connected to a non-inverting input terminal of a comparator through a second resistance, a third resistance is connected between ground and an inverting input terminal of the comparator, and an output terminal of the comparator is also connected to the inverting input terminal through a fourth resistance, the output terminal of the comparator is also connected to a base of a NPN transistor through a fifth resistance, and a collector of the NPN transistor is connected through a sixth resistance to the power voltage node, a seventh resistance is connected between a grounded emitter and the base of the NPN transistor, and the current limit signal is outputted from a collector side of the NPN transistor;

a position/speed detector for detecting a position and speed of a rotator of the BLDC motor and outputting a detecting signal in accordance therewith;

a microcomputer for outputting a pulse width modulation signal in accordance with the current limit signal from the current limit unit, and by judging the position and speed of the rotator from the detecting signal of the position/speed detector and comparing it with a request phase angle and phase difference, changing a duty cycle of the outputted pulse width modulation signal to an OFF state whenever the current limit signal indicates that an excess current condition has been detected; and a gate driving unit for controlling the operation of the power unit in accordance with the pulse width modulation signal from the microcomputer.

2. The current limit circuit of the inverter refrigerator according to claim 1, wherein the power unit comprises:

a rectification unit for outputting a rectified and smoothed DC power source by rectifying and smoothing an AC power source inputted from outside;

a SMPS for providing the power to each circuit unit inside of an apparatus by being inputted the DC power source rectified and smoothed from the rectification unit; and an inverter unit for being inputted the DC power source provided from the SMPS, converting it into a three phase AC power source, and outputting it.

3. The current limit circuit of the inverter refrigerator according to claim 1, wherein the gate driving unit outputs a switching control signal to the inverter unit by being inputted the pulse width modulation signal from the microcomputer.

4. The current limit circuit of the inverter refrigerator according to claim 2, wherein the rectification unit comprises a bridge diode for rectifying common AC power source inputted from outside and a smoothing condenser for smoothing the rectified DC power.

5. The current limit circuit of the inverter refrigerator according to claim 1, wherein the current limit unit outputs the current limit signal by comparing a present detected current level with a current limit level set in advance.

6. The current limit circuit of the inverter refrigerator according to claim 1, wherein the microcomputer further comprises an external interrupt port for quick response and wherein the current limit signal is applied to the external interrupt port of the microcomputer.

7. The current limit circuit of the inverter refrigerator according to claim 6, wherein an output signal of the external interrupt port turns the present outputted pulse width modulation signal off.

* * * * *